United States Patent [19]

Mixon

[11] 4,340,472
[45] Jul. 20, 1982

[54] WATER TREATMENT PLANT

[75] Inventor: James A. Mixon, Jacksonville, Fla.

[73] Assignee: American Enviro-Port, Inc., Jacksonville, Fla.

[21] Appl. No.: 262,310

[22] Filed: May 11, 1981

Related U.S. Application Data

[63] Continuation of Ser. No. 107,189, Dec. 26, 1979, abandoned, which is a continuation of Ser. No. 901,562, May 1, 1978, abandoned.

[51] Int. Cl.³ .......................... C02F 1/74; C02F 3/02
[52] U.S. Cl. ..................... 210/104; 210/134; 210/143; 210/151; 210/205; 210/220; 210/256
[58] Field of Search ............ 137/264, 572, 574, 576; 210/104, 151, 198.1, 199, 202, 205, 220, 256, 261, 123, 134, 143

[56] References Cited

U.S. PATENT DOCUMENTS

| | | | |
|---|---|---|---|
| 1,328,608 | 1/1920 | Woodward | 210/256 X |
| 1,596,526 | 8/1926 | Griffin | 137/576 X |
| 2,027,370 | 1/1936 | Currie | 210/205 |
| 2,703,607 | 3/1955 | Simmonds | 137/576 X |
| 3,143,498 | 8/1964 | Fordyce et al. | 210/151 X |
| 3,329,272 | 7/1967 | Roach | 210/261 X |
| 3,653,395 | 4/1972 | Chapman | 137/574 X |
| 3,682,307 | 8/1972 | Cook et al. | 210/151 X |
| 3,844,946 | 10/1974 | Farrell, Jr. | 210/104 |
| 3,925,206 | 12/1975 | Dea | 210/104 |
| 3,984,322 | 10/1976 | Peasley et al. | 210/256 X |
| 4,036,754 | 7/1977 | Peasley | 210/256 X |

FOREIGN PATENT DOCUMENTS 1115188 10/1961 Fed. Rep. of Germany ...... 137/264

*Primary Examiner*—Robert H. Spitzer
*Attorney, Agent, or Firm*—Arthur G. Yeager

[57] ABSTRACT

A water treatment plant including a cylindrical water storage tank provided with spaced opposite end walls with a longitudinal axis therebetween, a generally cylindrical pressure tank having a smaller diameter than the storage tank and provided with spaced curved end walls with a longitudinal axis therebetween, and an equipment chamber attached to one end wall of the storage tank wherein the end wall forms a common wall with the equipment chamber. One curved end wall of the pressure tank intersects and is rigidly connected to the common wall between the storage and pressure tanks. The longitudinal axis of the storage tank and pressure tank are parallel and generally coincident and spacer means rigidly connect the tanks.

Water normally passes through an aerator prior to being deposited in the storage tank. From the storage tank the water passes through a series of interconnected pipes, is chlorinated and alternatively fed either to the pressure tank or to a discharge pipe.

21 Claims, 6 Drawing Figures

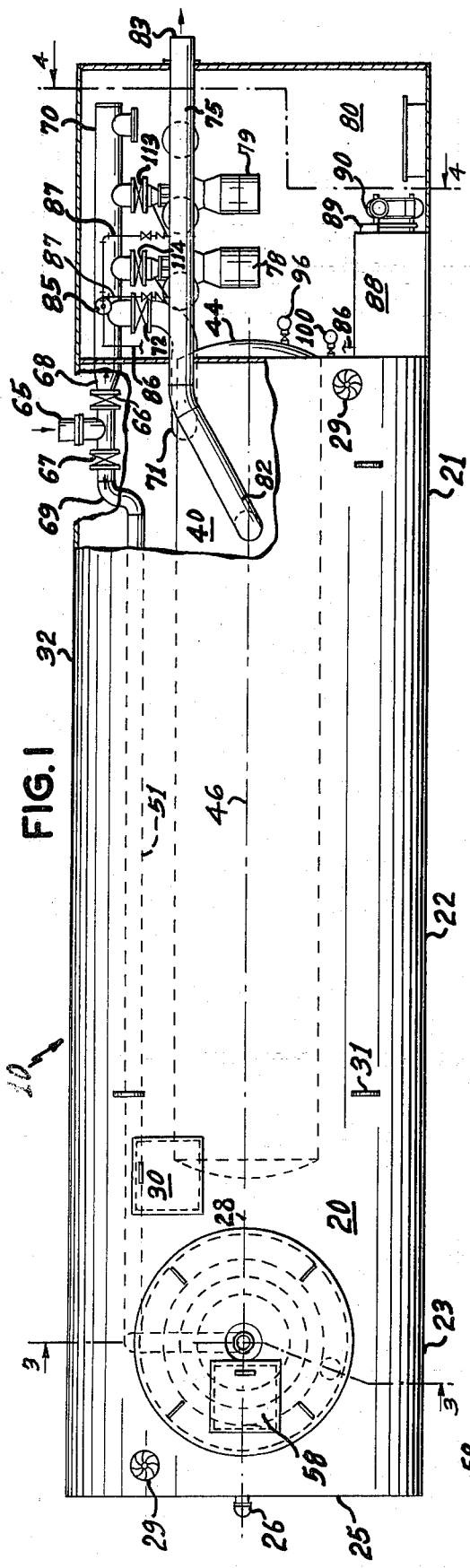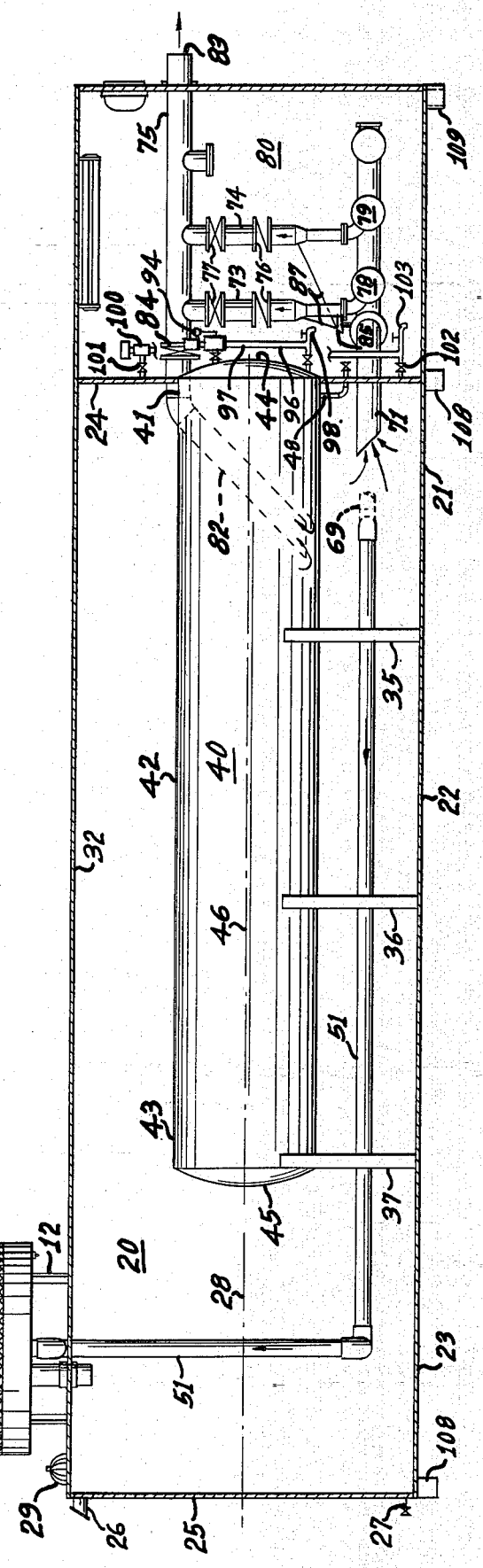

WATER TREATMENT PLANT

This is a continuation, of application Ser. No. 107,189, filed Dec. 26, 1979, which is a continuation of application, Ser. No. 901,562, filed May 1, 1978, both abandoned.

BACKGROUND OF THE INVENTION

1. Field of the Invention

The present invention relates to an apparatus for treating and conditioning water and more particularly to a unitary, portable treatment plant for improving the palatability of water.

With the large increase in the number of suburban subdivisions and resort developments and the proliferation of stricter water quality standards applied to both pre-existing and current residential developments, there has been a corresponding increase in the demand for efficient and economical water treatment plants. Portable treatment plants, which are efficient and economical to operate, are desirable in areas provided with limited access or where the size of the development precludes a more expensive permanent facility. Much of the water supplied to the water treatment plants originates from wells and pools of water. However, much of this groundwater contains undesirable quantities of dissolved gasses such as hydrogen sulfide, organic material, microorganisms and inorganic compounds containing elements such as iron, magnesium and calcium. Although much of the suspended solids and other debris can be removed by filtration and associated treatments, many dissolved substances and various bacteria render the water both foul smelling and tasting and otherwise unpalatable. Further treatment of the water by aeration causes the removal of many dissolved substances, such as hydrogen sulfide, and subsequent chlorination substantially disinfects the water.

This invention also relates to a water treatment plant which incorporates a pressurized discharge system to permit a substantially instantaneous and sufficient delivery of palatable water on demand. Many water treatment facilities which are designed to adequately treat drinking water fail to adequately provide for the discharge and delivery of the water from the tanks of the treatment plant to the user. As a result, various pumps and pressure vessels must be incorporated with the treatment plant to adequately deliver the water to the user. The water treatment plant of the present invention incorporates a pressure vessel generally disposed within a relatively larger storage tank to form a self-contained portable structure which is not only designed to be relatively efficent to operate but also relatively economical to fabricate.

2. Description of the Prior Art

Various water treatment plants are generally exemplified by U.S. Pat. Nos. 858,183, 888,090, 1,420,046, 2,591,134, 3,151,064 and 3,767,051. These treatment plants commonly contain aeration apparatus designed to remove various dissolved substances from the water.

Other disclosures which relate generally to storage tanks include U.S. Pat. Nos. 737,453, 1,227,287, 1,802,175, 1,830,923, 2,043,071, 2,186,923, and 2,692,608.

Water treatment plants having storage and pressure sections have been available, such plants usually requiring pressure heads substantially equal to the ends of the storage section.

Many problems have been encountered in the prior art which are substantially alleviated in accord with this invention.

SUMMARY OF THE INVENTION

Accordingly, a broad aspect of this invention is a water treatment plant provided with a generally elongated water storage tank provided with spaced opposite end walls of a predetermined lateral dimension and having a longitudinal axis therebetween, a generally elongated pressure tank provided with spaced opposite end portions of a lateral dimension less than the predetermined dimension and having a longitudinal axis between the end portions, and support means extending and rigidly connected between the storage tank and pressure tank for spacing the pressure tank inwardly from an inner longitudinal wall of the storage tank. A pipe means is disposed in fluid communication between the storage and pressure tanks for conveying water from the storage tank to the pressure tank.

Another aspect of this invention is the arrangement of the pressure tank within the storage tank in which the longitudinal-axes and the longitudinal walls of the two tanks are generally parallel. Furthermore, the longitudinal axis of the storage tank is substantially coincident with the longitudinal axis of the pressure tank.

An additional aspect of this invention relates to an equipment chamber attached to the storage tank wherein a common wall is defined between the storage tank and the equipment chamber and the pressure tank is disposed generally within said storage tank and firmly attached to said common wall.

A further aspect of the present invention relates to a pipe means which includes a discharge pipe extending from the pressure tank and through the equipment chamber for conveying fluid from the pressure tank through the discharge pipe and out of the water treatment plant. The pipe means also includes a connecting pipe extending from the storage tank and through the common wall and joined to the discharge pipe for conveying fluid from the storage tank to the discharge pipe. The discharge pipe includes an inflow-outflow pipe section attached to the pressure tank for conveying fluid into the pressure tank and thereafter out of the pressure tank. Pump means are attached to the pipe means for pumping water from the storage tank through the pipe means and into the pressure tank, and pressure tank sensing means are attached to the pressure tank for selectively operating the pump means until a predetermined amount of water is pumped into the pressure tank. Further, a storage tank sensing means is attached to the storage tank for rendering the pump means inoperative when the water level in the storage tank reaches a predetermined minimum level. A chlorination means is attached to the connecting piper for adding chlorine to the water when the pump means are operating.

Accordingly, a general object of this invention is to provide a portable water treatment plant for improving the palatability of water.

A particular object is the provision of a water treatment plant which incorporates a pressure tank disposed within a storage tank to deliver an adequate supply of water to the user.

A specific object is to eliminate the need of large pressure heads on prior pressure tanks in water treatment plants.

A related specific object is to provide a small pressure head on a pressure tank and dispose said head outwardly of and to a common wall of said storage tank.

Other objects are to provide an inexpensive water treatment plant which is compact and readily portable, easy to fabricate and efficient and durable in use and maintenance.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a top plan view of the water treatment plant;

FIG. 2 is a side elevational view thereof;

DESCRIPTION OF THE PREFERRED EMBODIMENT

Figure 3:
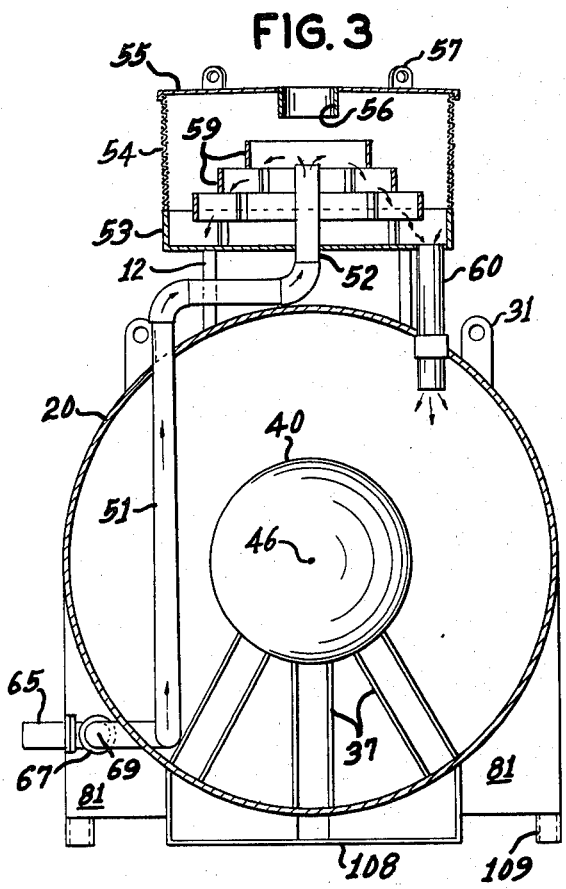
FIG. 3 is a cross-sectional view taken along line 3—3 of FIG. 1.
Figure 4:
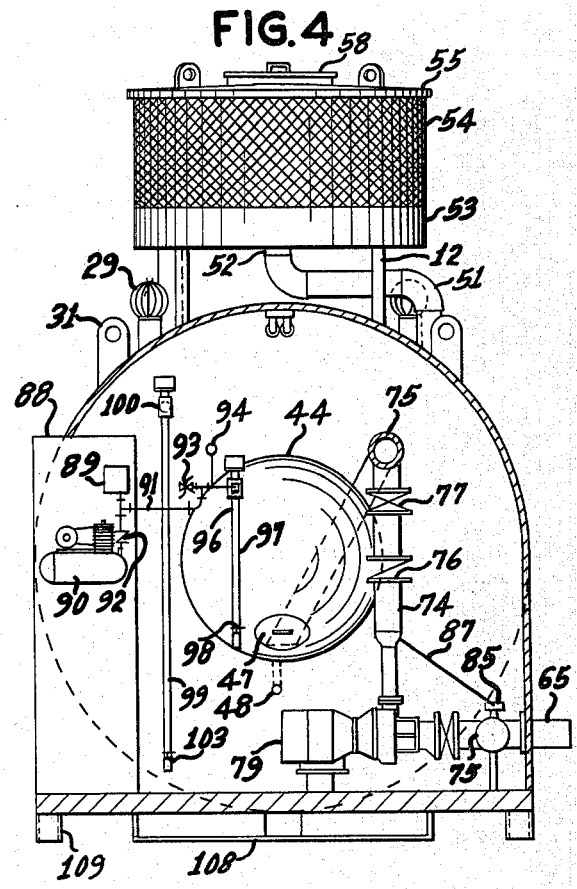
FIG. 4 is a cross-sectional view taken along line 4—4 of FIG. 1.

Refering now more particularly to the drawings, a generally cylindrical portable water treatment plant is designated by numeral 10 in FIG. 1 and includes a storage tank 20, a pressure tank 40, an aerator 50 and an equipment room or chamber 80.

In order to construct a water treatment plant which incorporates a blend of economical fabrication and structural integrity, the storage tank 20 is preferably cylindrical as generally shown in FIGS. 1-4. Although other cross-sectional configurations may be employed, such as rectangular shapes, the generally circular configuration of the storage tank is relatively easier to fabricate and permits the hydrostatic forces of the contained fluids to be transferred to hoop stresses in the cylindrical walls of the storage tank. Additionally, the generally cylindrical design permits a more even stress distribution of the applied forces, thus avoiding stress concentrations which may allow a structure to fail in an undesirable mode such as a fracture of the tank walls. This is particularly applicable to portable treatment plants which must be designed not only for various stresses related to transportation of the treatment plant but also for portable support foundations that fail to provide the same measure of support as are provided for more permanent structures.

The generally elongated cylindrical storage tank 20 includes a first end portion 21, an intermediate portion 22 and a second end portion 23, with a longitudinal axis 28 between such end portions, as shown in FIG. 2. The first end portion 21 includes a generally vertical first end wall 24 which defines a common wall with the equipment room 80 which is attached thereto. Second end portion 23 includes a generally vertical second end wall 25 provided with an overflow flap valve 26, and a lower drain valve 27. The intermediate portion 22 is generally represented by longitudinal wall section 32. As shown in FIG. 1, the top surface of the water treatment plant 10, within the region of the plant defined by the storage tank 20, is provided with air vents 29, an access hatch 30 and spaced lifting tabs 31, which permit the treatment plant to be lifted by cables or hooks attached thereto.

Having a generally cylindrical configuration, the pressure tank 40 includes a first end portion 41, an intermediate portion 42 and a second end portion 43. First end portion 41, which intersects and is rigidly connected to end wall 24, includes an outwardly curved and generally convex first end wall 44 which extends through end wall 24, as depicted in FIGS. 1 and 2. The other end portion 43, which extends within the storage tank 40, includes an outwardly curved second end wall 45 having a generally convex surface. Extending between opposite end portions 41 and 43 is a longitudinal axis 46, as shown in FIG. 2 and represented by a dot in FIG. 3. Preferably, the intermediate portion 42 of the pressure tank 40 is cylindrical to permit the transference of the outwardly directed pressure of the pressurized fluid into a hoop stress in the walls of the pressure tank. The curved or convex end walls when incorporated with the intermediate cylindrical tank section form a strong pressure vessel that is relatively less expensive to manufacture than tanks holding the same volume of liquid but having larger pressure heads and shorter intermediate cylindrical sections.

Extending within the storage tank 20, the pressure tank 40 is spaced from the inner longitudinal wall of the storage tank by spacer means in th form of end wall 24 and strut means 35, 36, and 37, as shown in FIGS. 2 and 3. Preferably, the strut means 35, 36 and 37 comprise a plurality of I-beam strut members radially disposed with respect to the longitudinal axis 46. Although strut means 37 in FIG. 3 is illustrated as having only three radial struts, a plurality of struts can be arranged to extend from the inner surface of the side and top portions of the storage tank to respective side and top portions of the pressure tank to form a reinforcing network similar to that of a spoked wheel. If an especially stable design is desired, the strut means and end wall 24 can be arranged to cooperatively dispose the pressure tank 40 so that the longitudinal axis 46 of the pressure tank 40 is disposed generally parallel to the longitudinal axis 28 of the storage tank 20. When the pressure tank and storage tank are arranged so that their respective longitudinal axes are substantially coincident, the resulting structure will be stabilized not only against localized forces but also against loadings (eg. shear, tension, torsion, compression and bending) differentially applied along the longitudinal length of the storage and pressure tanks. Additional longitudinal reinforcement may be provided by extending longitudinal reinforcing elements from the longitudinal tank wall of the pressure tank 40 to the end wall 25 of the storage tank, if found desirable.

Although the end portion 43 is disposed within and spaced from the inner walls of the storage tank in FIGS. 1 and 2, the relative length of the pressure tank may be shortened or lengthened, depending upon the selected design criteria for the water treatment plant. For example, the pressure tank 40 may be lengthened to intersect or extend through the end wall 25 when the design criteria require a relatively large volume of pressurized fluid.

Water enters the treatment plant through a T-shaped well supply line coupling 65 positioned adjacent to and outside the bottom of the first end portion 21 of the storage tank, as is generally shown in FIG. 1. Preferably, the T-shaped supply line coupling 65 includes valves 66 and 67 disposed on the ends of the coupling 65, and such valves are respectively connected to a reducer section 68 and an elbow pipe section 69, which are welded respectively to an end wall extension 81 of the equipment room and the longitudinal wall 32 of the storage tank. The water flows either through the valve 67 and elbow 69 to an aerator pipe 51 or through valve 66 and reducer 68 to a distribution pipe section 70 of the connecting pipe assembly. The bypass valve 66 is closed during normal operation and it may be opened to allow the water to circumvent the aerator and storage tank in the event that repairs or maintenance are made to the aerator, storage tank or pressure tank. Thus, the water treatment plant can be operated substantially continuously without the necessity of back-up water treatment facilities.

Being disposed on the top surface of end portion 23 or the storage tank, the aerator 50 is spaced from the top of the storage tank by brace members 12. Generally comprising a vertical cylindrical housing, the aerator comprises a bottom pan 53; a removable cover 55 provided with a center passage 56, lifting tabs 57 and a hatch 58; and a wire mesh or screen 54 which permits the air to circulate freely therethrough without permitting the passage of leaves and undesirable debris. Supported from the inner surface of the bottom pan 53 are a stacked assembly of slat trays 59 arranged in a cross pattern to allow for maximum cascade aeration of the fluid. Extending centrally within the stacked array of slat trays 59 is an inlet pipe 52 joined to an end portion of aerator pipe 51. After the fluid passes through the aeration trays, it flows through an outlet pipe 60 into the second end portion 23 of the storage tank 20. Upon being deposited within the storage tank some settling of particles may occur and the fluid eventually flows toward a storage tank outlet suction pipe 71. As a result of the streamlined construction of the tanks and the spaced configuration of the various strut means, the water flows in an unrestricted manner towards the suction pipe 71.

Suction pipe 71 extends through the end wall 24, which defines a common wall between the storage tank 20 and the equipment chamber 80, and is connected to the distribution pipe 70, as depicted in FIGS. 1 and 2. A valve 72 is provided in suction pipe 71 to close the pipe when the bypass valve 66 is opened. First and second vertical pipe sections 73 and 74 extend between the distribution pipe 70 and an intermediate portion of the treatment plant discharge pipe 75. The vertical pipe sections each include a one way check valve 76 and a manual operated valve 77, which can be closed when repair or routine maintenance is made to the respective pipe and its associated equipment. As shown in FIG. 2 additional openings are provided in the distribution and discharge pipes to permit an additional vertical pipe section to be inserted therebetween. Pump means in the form of a first pump 78 and a second pump 79 are connected respectively to the first and second vertical pipes to draw water into the suction and distribution pipes and subsequently pump the water up the respective vertical pipes and into the discharge pipe 75. The discharge pipe has two end portions, one of which includes an inflow-outflow pipe section 82, which extends into the pressure tank, and the other end portion leads to a treatment plant discharge opening 83. The relative pressure difference that exists between the pressure tank 40 and the discharge opening will dictate the direction of flow of the water in discharge pipe 75. For example, an opening of a faucet valve or the like connected to the discharge pipe will cause a drop in pressure at the discharge opening 83 and water in the distribution system (e.g. discharge pipe 75 and pressure tank 40) will flow outwardly therefrom. Pipe section 82 includes a valve 84 which can be closed when repair or other maintenance is made to the pressure vessel. Access to the interior of the pressure vessel is permitted through manhole 47, which is accessible through equipment chamber 80, preferably after most of the water has been removed from the tank through drain pipe 48.

Figure 6:
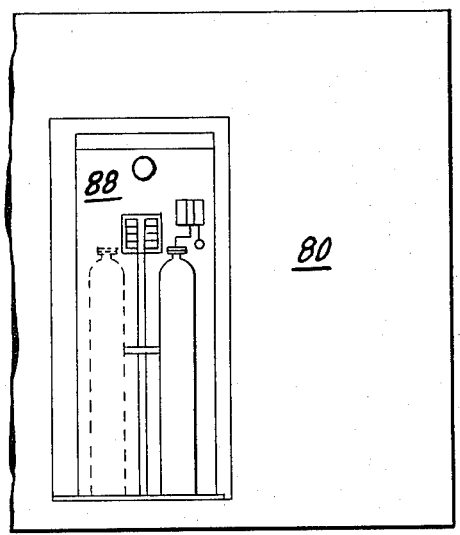
FIG. 6 is a frontal view of the chlorine room of the treatment plant.
Figure 5:
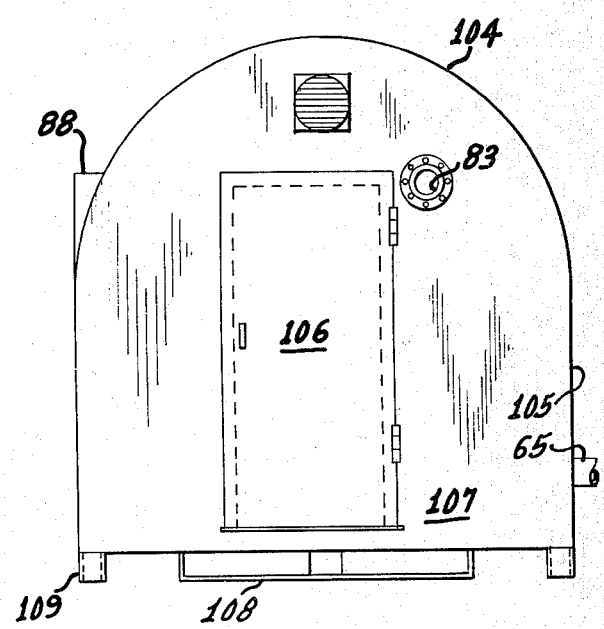
FIG. 5 is an end elevational view of the treatment plant.

Chlorination of the water is effected by a chlorine injector 85 connected to the distribution pipe 70. In the chlorine injector 85, chlorine is fed through a chlorine line 86 and mixed with water fed through eductor lines 87 extending between the chlorine injector 85 and the respective first and second vertical pipes 73 and 74. The chlorination assembly is constructed so that chlorination occurs only when water is being fed through an eductor line, which occurs when the pump of the respective vertical pipe 73 and/or 74 is in operation. Chlorine line 86 extends from the chlorine injector to a chlorine room 88, partially illustrated in FIG. 6, which is accessible through an outside door located in the outer wall of the equipment chamber 80. The amount of chlorine fed to the injector 85 is regulated by control equipment located in the chlorine room, which is illustrated in FIG. 6.

Attached to the end wall 44 of the pressure tank 40 is a control means in the form of a pressure sensing means, generally represented by numeral 89, and a liquid level sensing means 96. The pressure tank sensing means 89 selectively operates the pumps 78 and/or 79 and an air compressor 90 until a predetermined amount of water is pumped into the pressure tank 40. The air compressor 90 is activated by a pressure switch in pressure sensing means 89 when the air pressure in the pressure tank 40 falls below a predetermined minimum. The air compressor feeds compressed air to the storage tank 40 through an air line 91, to which is attached a check valve 92, pressure sensing means 89, a pressure relief valve 93 and a pressure gauge 94. The pressure sensing means 89 also includes two switches which selectively control respectively pumps 78 and 79. For example, when the pressure in tank 40 drops to a pre-determined low level, such as 45 p.s.i., a first pressure switch will activate first pump 78 until the pressure rises to a pre-determined shut-off level, such as 50 p.s.i. However, if the demand for water is high and water is being rapidly drawn from the pressure tank 40 through the discharge pipe 75, the pressure may continue to fall until a second pre-determined level is reached, such as 40 p.s.i., whereupon the second pump 79 is activated. Both of the pumps will continue to operate until the pre-determined pressure is reached.

Also attached to the end wall 44 of the pressure tank 40 is a liquid level sensing means 96 for maintaining a pre-determined air-liquid volume relationship, such as 50% air and 50% water, in the pressure tank 40. The liquid level sensing means 96 includes a sight glass electrode holder 97 provided with shut-off valves (illustrated in FIG. 2) located at the top and bottom of the holder 97 to allow for servicing of the electrodes contained therein. A faucet 98 is installed at the bottom of the electrode holder 97 to allow sampling and dewatering of the pressure tank. The electrode holder 97 preferably contains two spaced electrodes adjustably positioned so that the higher electrode will activate the air compressor 90 when the water level in the storage tank 40 rises to a pre-set value and the lower electrode will deactivate the air compressor 90 when the water level in the storage tank reaches a pre-set minimum level.

The storage tank liquid level sensing means 99 is of similar construction as the pressure tank liquid level sensing means 96. Sensing means 99 includes an electrode holder 100 provided with shut-off valves 101 and 102 located at the top and bottom of the electrode holder and a faucet 103 installed at the bottom of the electrode holder. The storage tank electrode holder contains three adjustable electrodes: a bottom electrode which stops the operation of the pumps 78, 79 when a pre-determined minimum water level is reached in the storage tank to prevent the pumps from running dry, a second electrode which activates a well pump (not shown), and a third electrode which stops the well pump when a pre-established high water level has been reached in the storage tank 20.

The equipment 80 has a cylindrical upper portion 104 having the same curvature as the storage tank and a rectangular lower portion 105 provided with a flat floor. Access to the equipment room is provided by a door 106 located in end wall 107 of the equipment room.

The treatment plant is supported by saddle supports 108, as depicted in FIG. 3, and square supports 109 which are connected to the bottom of the equipment chamber.

If repairs are to be made to the pumping assembly such as pump 78 valves 114 and 77 of vertical pipe section 73 are closed to allow access thereto. Additionally, the valves in the line 87 are closed to prevent a leakage of chlorine and/or water from the chlorinator 85. Similarly, if repairs are made to pump 79, valves 113 and 77 and the valves of the line 87 are closed. Generally, only one pump will be serviced at a time to permit continuous operation of the treatment plant. Further, if the storage tank 20 is inoperative, bypass valve 66 will be opened and valves 67 and 72 will be closed to prevent a flow of water into the storage tank and permit a continuous operation.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a water treatment plant which receives untreated water, treats it to make it potable, and delivers the potable water under pressure required for modern residential water systems, a generally elongated water storage tank provided with spaced opposite end walls of a predetermined lateral dimension and having a longitudinal axis therebetween, a generally elongated closed pressure tank capable of containing water and air under pressure required for modern residential water systems, said pressure tank being substantially totally enclosed within said storage tank and being provided with spaced opposite curved end portions of a lateral dimension less than said predetermined dimension and having a longitudinal axis generally parallel to said longitudinal axis of said storage tank, one said end portion of said pressure tank intersecting and being rigidly connected to one said end wall of said storage tank, pipe means in fluid communication between said storage and pressure tanks for conveying potable water from said storage tank to said pressure tank, pump means operatively connected to said pipe means for automatically pumping potable water to said pressure tank from said storage tank to maintain a selected level therein and means for automatically maintaining air in said pressure tank under pressure sufficient to deliver potable water from said pressure tank under pressure required for modern residential water systems.

2. A water treatment plant according to claim 1, wherein said longitudinal axis of said storage tank is substantially coincident with said longitudinal axis of said pressure tank.

3. The water treatment plant according to claim 1, wherein said storage tank has a longitudinal inner wall, further comprising spacer means extending between and rigidly connecting said storage tank and said pressure tank for supporting said pressure tank from said inner longitudinal wall.

4. The water treatment plant according to claim 1, wherein said pressure tank is cylindrical.

5. The water treatment plant according to claim 4, wherein said storage tank is cylindrical.

6. The water treatment plant according to claim 5, wherein said longitudinal axis of said storage tank is substantially coincident with said longitudinal axis of said pressure tank.

7. The water treatment plant according to claim 5, wherein said storage tank has a longitudinal wall, said pipe means includes an inflow-outflow pipe for conveying potable water from said storage tank into said pressure tank and thereafter out of said pressure tank for usage outside of said plant, further comprising spacer means extending between and rigidly connecting said storage tank and said pressure tank for supporting said pressure tank inwardly of said longitudinal wall.

8. The water treatment plant according to claim 1, further comprising storage tank sensing means attached to said storage tank for rendering said pump means inoperative when the water level in said storage tank reaches a predetermined minimum level.

9. The water treatment plant according to claim 1, wherein said pipe means includes an inflow-outflow pipe for conveying potable water from said storage tank into said pressure tank and thereafter out of said pressure tank for usage outside of said plant.

10. In a water treatment plant which receives untreated water, treats it to make it potable, and delivers the potable water under pressure required for modern residential water systems, a generally horizontal elongated storage tank having a longitudinal wall and end walls, a generally elongated closed pressure tank substantially totally enclosed within said storage tank and capable of containing water under pressure required for modern residential water systems, said pressure tank having a longitudinal wall and curved end wall portions, means for connecting one of said curved end wall portion to one said end wall, support means extending and rigidly connected between said storage tank and pressure tank for spacing said pressure tank inwardly from said longitudinal wall and within said storage tank and pressure tank, pipe means in fluid communication between said storage tank and said pressure tank for conveying potable water from said storage tank to said pressure tank, pump means operatively connected to said pipe means for automatically pumping potable water to said pressure tank from said storage tank, to maintain a selected level therein, and means for automatically maintaining air in said pressure tank under pressure sufficient to deliver potable water from said pressure tank under pressure required for modern residential water systems.

11. The water treatment plant according to claim 10, wherein said pipe means includes an inflow-outflow pipe section attached to said pressure tank for conveying potable water into said pressure tank and thereafter out of said pressure tank.

12. The water treatment plant according to claim 10, wherein the longitudinal axis of said storage tank is substantially coincident with the longitudinal axis of said pressure tank.

13. In a water treatment plant which receives untreated water, treats it to make it potable, and delivers the potable water under pressure required for modern residential water systems, a generally horizontal elongated storage tank having opposite end portions, a generally elongated pressure tank substantially totally enclosed within said storage tank and capable of containing water under pressure required for modern residential water systems, said pressure tank having opposite curved end portions, an equipment chamber attached to one of said end portions of said storage tank, one said end portion of said storage tank including an end wall which defines a common wall with said equipment chamber, one of said curved end portions being rigidly attached to said common wall and being exposed within said equipment chamber, pipe means in fluid communication between said storage tank and said pressure tank for conveying potable water from said storage tank to said pressure tank, pump means operatively connected to said pipe means for automatically pumping potable water to said pressure tank from said storage tank to maintain a selected level therein, and means for automatically maintaining air in said pressure tank under pressure sufficient to deliver potable water from said pressure tank under pressure required for modern residential water systems.

14. The water treatment plant according to claim 13, wherein said pipe means includes a discharge pipe extending from said pressure tank and through said equipment chamber for conveying potable water from said pressure tank through said discharge pipe and out of said water treatment plant.

15. The water treatment plant according to claim 14, wherein said discharge pipe includes an inflow-outflow pipe section attached to said pressure tank for conveying potable water into said pressure tank and thereafter out of said pressure tank.

16. The water treatment plant according to claim 14, wherein said pipe means includes a connecting pipe extending from said storage tank and through said common wall and joined to said discharge pipe for conveying fluid from said storage tank to said discharge pipe.

17. A water treatment plant according to claim 16 further comprising a chlorination means in fluid communication with said connecting pipe for selectively mixing chlorine with the water passing therethrough.

18. A water treatment plant as defined in claim 13 wherein said means for automatically maintaining air includes an air compressor in said chamber for supplying air to said pressure tank and control means for selectively controlling said air compressor and said pump means whereby the air pressure and water level in said pressure tank is controlled, the air pressure in said pressure tank delivering potable water from said pressure tank upon demand without requiring said pump means to operate until the water level drops below a predetermined level in said pressure tank.

19. A water treatment plant according to claim 18, wherein said control means includes pressure tank sensing means attached to said pressure tank for selectively operating said pump means, said control means includes liquid level sensing means attached to said pressure tank for selectively operating said air compressor.

20. A water treatment plant according to claim 19, further comprising another liquid level sensing means attached to said storage tank for overriding the operation of said pump means when the water level in said storage tank drops to a predetermined low level.

21. A water treatment plant according to claim 20, wherein said other liquid level sensing means controls the level of the water in said storage tank above said predetermined low level.

* * * * *